April 28, 1964  C. A. OPPEDAHL  3,131,393
ERROR COMPENSATION IN RADIO DIRECTION FINDERS
Filed March 20, 1962  3 Sheets-Sheet 1

INVENTOR.
CHARLES A. OPPEDAHL
BY Moody & Anderson
AGENTS

INVENTOR.
CHARLES A. OPPEDAHL
BY
Moody & Anderson
AGENTS

April 28, 1964 C. A. OPPEDAHL 3,131,393
ERROR COMPENSATION IN RADIO DIRECTION FINDERS
Filed March 20, 1962 3 Sheets-Sheet 3

INVENTOR.
CHARLES A. OPPEDAHL
BY
Moody & Anderson
AGENTS

United States Patent Office 3,131,393
Patented Apr. 28, 1964

3,131,393
ERROR COMPENSATION IN RADIO
DIRECTION FINDERS
Charles A. Oppedahl, Cedar Rapids, Iowa, assignor to Collins Radio Company, Cedar Rapids, Iowa, a corporation of Iowa
Filed Mar. 20, 1962, Ser. No. 181,129
12 Claims. (Cl. 343—114)

This invention relates generally to radio direction finding techniques and more particularly to an improved means for compensating inherent error in bearing indications as derived from airborne radio direction finders.

Automatic direction finders employ a loop antenna to sense direction to a radio station and operate on the principle of nulling the loop as concerns its orientation with respect to the magnetic field of a radio station. Numerous such systems are known in the art and automatic direction finding (ADF) is widely employed in radio navigation.

Airborne ADF systems are subject to errors in the indicated ADF bearing as a function of aircraft bank angle. For this reason, pilots have long disregarded the ADF indication when in a bank, since the indication is known to be erroneous. This bearing error induced with aircraft bank is perhaps not too serious when the pilot utilizes the information as an observation in response to which he manually guides the aircraft. Under manual control he can readily ignore the indication during bank movements and ADF bearing error as a function of bank does not seriously reduce the usefulness of the ADF as a navigation tool. If, however, it is desirable to utilize ADF bearing information as an input parameter for automatic piloting of an aircraft, the bank-induced error is extremely undesirable, if not prohibitive, since the automatic pilot does not "ignore" the ADF bearing during bank as a pilot may elect to do when flying manually. In this type of application the introduction of an ADF bearing error with bank is instantaneously interpreted by the automatic pilot as a command to bank the aircraft for correction; the result being a very undesirable oscillatory flight path about the desired ADF bearing radial.

Means have been employed in the art to correct ADF systems and one such means, for example, includes the stabilization of the ADF loop antenna with respect to the horizon, thereby obviating the introduction of cyclic error caused by what previously would be a tilt of the antenna base with respect to horizontal during bank movements.

Applicant has found that ADF bearing error is attributable, in addition to that inherently induced by the basic geometric considerations of the ADF loop antenna to the distortion of the electromagnetic field due to the aircraft configuration. This distortion may be attributed to the wing surfaces of a conventional winged aircraft which introduces a bending or distortion of the electromagnetic field as it is presented to the loop. Experiment has indicated that the bank induced bearing error may be generally considered a function which is proportional and polarity sensitive to aircraft bank attitude. Further the error has been found to be a function of aircraft bearing with respect to the station and maximum when the aircraft is either going towards or away from the station while being nearly zero when the station is off either wing. This error, from an empirical analysis, varies as a function of bank angle and as an angle function of the ADF bearing.

It is an object, therefore, of the present invention to provide, in an ADF system, means for compensating for bank-induced error by a correction factor proportional to bank and additionally substantially proportional to an angle function as regards the ADF bearing.

It is a further object of the present invention to provide an improved ADF system wherein an ADF indication is continuously compensated for bank induced error and may be reliably utilized during bank movements.

A still further object of the present invention is the provision of an ADF system employing novel electromechanical means for inducing bearing correction.

A still further object of the present invention is provision of a bearing corrected ADF system including means for including magnetic reference in conjunction with a selected magnetic course wherein a deviation signal is developed with correction for bank induced ADF error.

The invention is featured in the development and novel inclusion of a compensating signal or signal modification which varies as a function of the bank angle and as predetermined angle function of the ADF bearing.

These and other features and objects of the present invention will become apparent upon reading the following description in conjunction with the accompanying drawings in which.

It should be emphasized here that the object of the present invention is to provide a compensation means for the bearing error which reduces the error sufficiently to enable the usage of the ADF bearing information as an input parameter for automatic pilot operation. The invention finds its basis in an empirical analysis of the bearing error function as obtained from actual measurement data. It is realized that the particular and exact bearing error function would experience variations from the particular function for any given installation. Experimental data, however, bears out that, in general, the error follows a similar function to that shown in FIGURE 1, and it is the purpose of the present invention to reduce this error based on empirical analysis and not particularly to precisely cancel the error.

Figure 1:
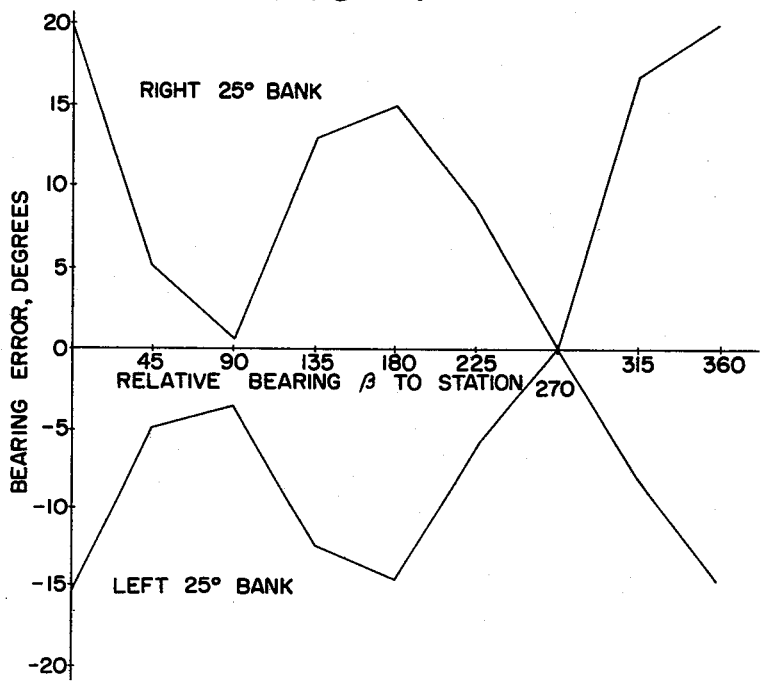
FIGURE 1 illustrates a typical ADF bearing error function of the type to be corrected.

With reference to FIGURE 1, note that the bank induced error is very nearly zero at ADF bearings of 90° and 270° while being maximum at ADF bearings of zero and 180°. The bearing error function might then be considered to vary as a double-angle cosine function of the relative bearing to the station wherein the double angle function is displaced from the zero axis, the latter indicating a direct current component. A compensation curve definitive of the error curve might therefore be made up of two inputs, one of which is proportional to bank, and the second of which is proportional to bank but also to the cosine of twice the relative bearing angle $\beta$. An empirical correction function might then take the form of $K_1\phi + K_2\phi \cos 2\beta$ where $K_1 = K_2$ and the magnitude of $K_1$ and $K_2$ may be experimentally adjusted to yield optimum compensation for a particular ADF installation.

Figure 2:
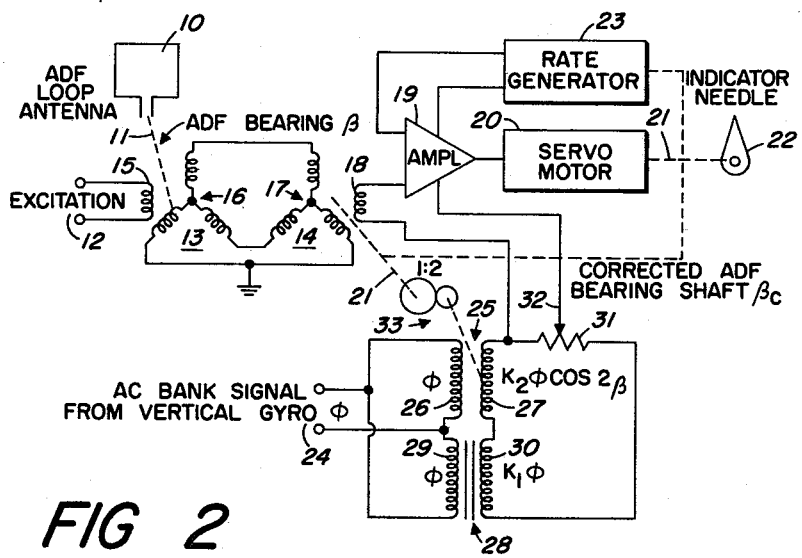
FIGURE 2 is a functional embodiment of a corrected ADF indicating system.

An embodiment of the development and inclusion of compensation based on this curve analysis is illustrated in FIGURE 2. FIGURE 2 is a functional diagram of an ADF indicating system as it might be modified in accordance with the present invention to compensate for the bank induced errors in ADF bearing indication. An ADF loop antenna 10 is positioned in accordance with receiving and null detecting circuitry (not illustrated) to a relative bearing indicative of an ADF bearing $\beta$ to the station. For purposes of bearing indication, the position of the antenna shaft 11 is converted through a servo repeating system to an indication 22 of the bearing error. For this purpose, the mechanical position of shaft 11 is converted to an electrical signal by means of a synchro transmitter 13, the rotor 16 of which is positioned in accordance with the antenna shaft 11 while the stator 15 is energized with a source 12 of alternate current excitation voltage. The bearing definitive voltages introduced in the multiple windings of rotor 16 of synchro transmitter 13 are connected to corresponding windings of the rotor 17 of a synchro transformer 14, the stator 18 of synchro transformer 14 having introduced therein an error voltage corresponding to the discrepancy between the angular position of the rotors of synchro transformer 14 and synchro transmitter 13, respectively. In known conventional repeater systems, the error voltage introduced in stator 18 is applied as input to a servo amplifier 19 to drive a servo motor 20. The output shaft 21 of motor 20 is utilized to position the rotor 17 of synchro 14, for null. The shaft position 21 of servo motor 20 is therefore indicative of the ADF bearing $\beta$. The system might conventionally include a rate generator 23 driven in accordance with the rotational output 21 of motor 20 so as to provide rate feedback and appropriate damping. It is to be noted, however, that in the system of FIGURE 2, the error voltage applied to servo amplifier 19 is modified by having combined therewith a signal taken from wiper arm 32 of a potentiometer 31, and this latter expedient provides a compensation for the ADF bearing error in accordance with the present invention. In effect, the error signal conventionally developed in stator 18 of synchro transformer 14 is modified by having added in series therewith a compensation signal which biases the repeater shaft 21 to the correct bearing indication when the aircraft is banked. The bank compensation in FIGURE 2 is a function of bank angle $\phi$ and the cosine of twice the ADF bearing $\beta$ and is developed as follows: An A.C. signal 24 proportional to bank angle $\phi$ (which might be taken from a conventional vertical gyro pick-off device) is applied to the primary winding 29 of a transformer 28 so as to introduce in the secondary winding 30 thereof a voltage proportional to bank angle $\phi$. Bank signal 24 is additionally applied to the stator 26 of a resolver 25. The rotor 27 of resolver 25 has induced therein a voltage proportional to the bank angle $\phi$ modified by the angular position of the rotor 27 with respect to the stator 26. The cosine $2\beta$ function is readily introduced by coupling the rotor 27 of resolver 25 through a 2 to 1 gear ratio as provided by gear drive 33 to the repeater shaft 21. The voltages induced in rotor 27 of resolver 25 and secondary winding 30 of transformer 28 are combined and applied across potentiometer 31. The error signal applied to servo amplifier 19 then comprises the bank correction signal combined with a conventional ADF bearing error signal and is proportional to $K_1\phi + K_2\phi \cos 2\beta$. The position of wiper arm 32 on potentiometer 31 provides an adjustment for the combined signal level by which optimum compensation may be introduced for a particular installation. The ADF bearing shaft is thus indicated as being positioned to the corrected relative bearing $\beta_c$.

The above compensation was based on an empirical analysis of the error function of FIGURE 1 wherein the maximum and minimum points were considered definitive of a $\cos 2\beta$ proportionality. A further and perhaps more precise analysis of the air curve indicates that the error approaches zero at relative bearings of 90° and 270° in the manner of a full wave rectification function and the curve suggests that the function might be empirically defined as the absolute value of $\cos \beta$ which may be considered a rectified $\cos \beta$ function assuming $\beta$ is represented by an alternating current voltage. The displacement of the function from the zero axis would again be proportional to the bank angle $\phi$. It is to be noted that the compensation based on a double angle analysis and that presently considered each closely approximate the bearing error curve.

Figure 3:
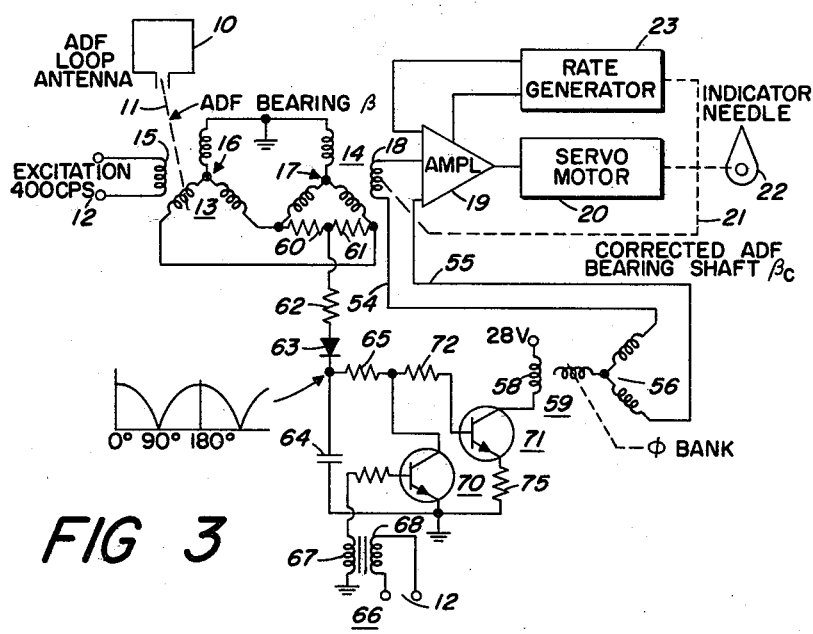
FIGURE 3 is a further embodiment utilizing essentially electrical means for inducing a compensating correction in accordance with the present invention.

FIGURE 3 illustrates an embodiment for ADF bearing error compensation in accordance with the present invention wherein a bearing correction is developed and introduced by a substantially passive electronic arrangement. The circuitry provides a correction signal having the above-discussed proportionality to the absolute value of the cosine of the bearing angle $\beta$ with further modification as a function of bank angle $\phi$.

With reference to FIGURE 3, the uppermost portion of the figure is seen to be similar to that of the previous embodiment in providing a servo system which develops a shaft position repeating that of the ADF loop antenna. Corresponding portions of the embodiments of FIGURE 3 and FIGURE 2 carry like reference numerals. The correction voltage is combined with the normal repeater servo error voltage as developed by synchro transformer 14. In this instance the bearing indicator shaft 21 is connected to the output winding 18 of synchro transformer 14. ADF bearing indicative voltage, as developed in the multiple winding element of synchro 14, is converted to a "two-wire" bearing information signal by means of the resistor network 60, 61 and 62 connected across two terminals of synchro 14 with the third terminal being the common return or ground reference in common with that of the electronic network to be described.

The bearing indicative signal from the resistive network is rectified and filtered by application through diode 63 and capacitor 64 such that the signal at the junction between diode 63 and diode 64 is a D.C. signal proportional to bearing, but of positive polarity with respect to common ground reference for both 0° and 180°, as indicated.

The manner in which this D.C. signal proportional to the absolute value of $\cos \beta$ is developed may be seen from a further analysis of the circuitry. With reference to FIGURE 3, the synchro transmitter 13 positioned in accordance with the ADF bearing $\beta$ may be oriented as illustrated for the condition of zero ADF bearing such that the rotor arms to which the resistors 60 and 61 are connected have induced therein voltages of equal magnitude, but of opposite phase, and thus cancel one another. It is to be noted further that the rectifying diode and capacitor are serially connected with resistor 62 between the junction of resistors 60 and 61 and common ground, and, for a condition of zero ADF bearing as illustrated, the grounded synchro winding has induced therein a maximum voltage. With rotation of the synchro windings from the illustrated zero bearing position, the magnitude of the voltage varies cosinusoidally, but due to the rectification and filtering provided by diode 63 and capacitor 64 the signal at the junction of these elements is that of a single polarity direct current signal which is maximum at zero and 180° as desired. For purposes of utilizing this direct current voltage correction function in the system of FIGURE 3, the direct current compensation function is converted to an alternating current function of similar varying magnitude and with periodicity determined by the system excitation frequency.

Accordingly, the D.C. signal developed by this detection network is applied through resistors 65 and 72 to the base of a transistor 71 which functions as an amplifier with its collector connected through the stator 58 of a synchro transmitter 59 to a source of D.C. supply voltage. The emitter of transistor 71 is returned to ground through a resistor 75. The voltage as applied to transistor 71 is, however, chopped by the action of a second transistor 70 having its collector connected to the base of transistor 71 and emitter connected to ground. The chopping action occurs at a rate determined by the frequency of a reference signal source 12 (common to that applied to the ADF bearing repeater loop) as applied to the primary winding 68 of a transformer 66. The reference signal thereby introduced into the secondary winding 67 of the transformer 66 is applied between base and emitter of transistor 70 to alternately effect conduction of transistor 70 at repetitive intervals determined by the frequency of the reference source 12.

The D.C. voltage developed between the junction of diode 63 and capacitor 64 and ground is thus chopped at an A.C. rate determined by the reference source frequency. This chopped D.C. signal is amplified by transistor 71 and applied to the stator 58 of the bank synchro transmitter 59. The rotor 56 of synchro transmitter 59 is positioned in accordance with bank angle $\phi$ by being connected to a rotational source indicative of bank angle. This source is not illustrated but might readily be available from a bank angle repeating servo system. The output 54—55 of bank synchro transmitter 59 is zero for zero bank angle and, for any particular bank angle $\phi$, the output of synchro transmitter 59 is proportional to both bank angle $\phi$ and the ADF relative bearing $\beta$, the latter proportionality being introduced by the signal applied from transistor 71 to the stator 58 of synchro 59. As in the case of the ADF bearing synchro transmitter, the bank synchro transformer 59 may have an angular relationship between rotor and stator as illustrated in FIGURE 3 for condition of zero bank angle $\phi$. For this condition the voltages induced in the windings are equal and opposite in phase such that the compensation output is zero. Rotation of the bank synchro transformer from the zero condition is seen to produce an output with phase reversed from left and right bank.

The output from the bank synchro carrying the proportionality factors in accordance with the present invention is combined with the conventional repeater servo error signal developed in synchro transformer 14 for application to servo amplifier 19 such that the ADF bearing repeater shaft 21 is continually biased by a correction factor proportional to bank angle $\phi$ and the absolute value of cos $\beta$ and bears the desired similarity to the previously discussed cos $2\beta$ function.

Figure 5:
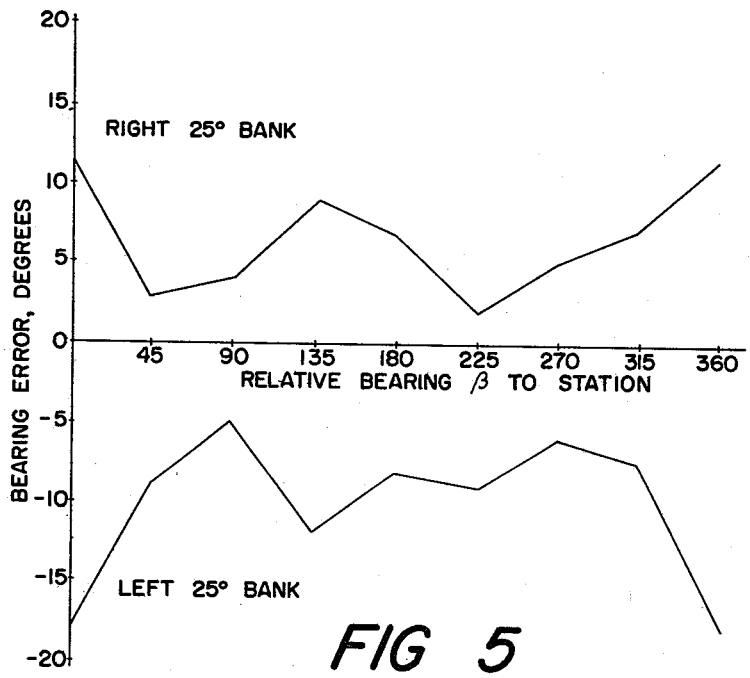
FIGURE 5 illustrates an ADF bearing error function in a system employing means to reduce quadrantal error.
Figure 6:
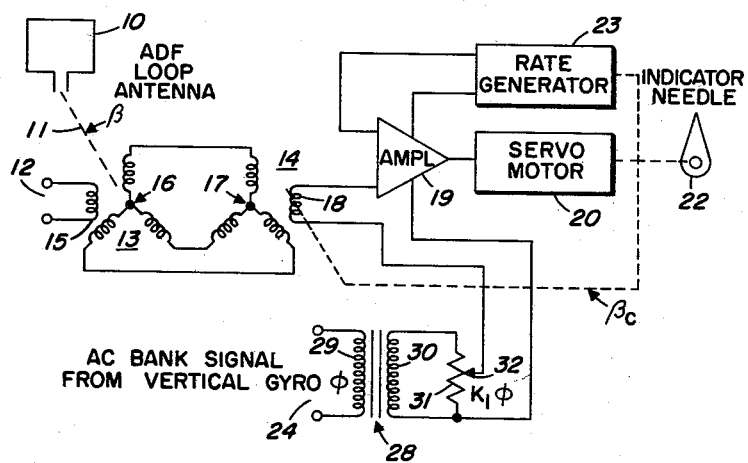
FIGURE 6 is a functional embodiment of a means for effectively compensating for an error such as shown in FIGURE 5.

Experiment has further shown that in ADF antenna systems wherein ferrite correctors are used to compensate for quadrangular error the bank induced error is modified by the correctors. The resultant effect is illustrated on the error correction of FIGURE 5 wherein it is seen that the cosinusoidal function of $\beta$ is attenuated. Under such conditions the ADF system might be compensated in accordance with the simplified arrangement illustrated in FIGURE 6. The system of FIGURE 6 compensates strictly as a function of bank angle without consideration of the bearing error function. The system of FIGURE 6 accordingly might be similar to that of FIGURE 2 wherein the bank correction is induced through transformer 28 and serially combined with the error input signal to servo amplifier 19. In this instance the resolver and particular gear drive arrangement of the more precise system of FIGURE 2 is eliminated and compensation is effected only as a function of bank angle.

Figure 4:
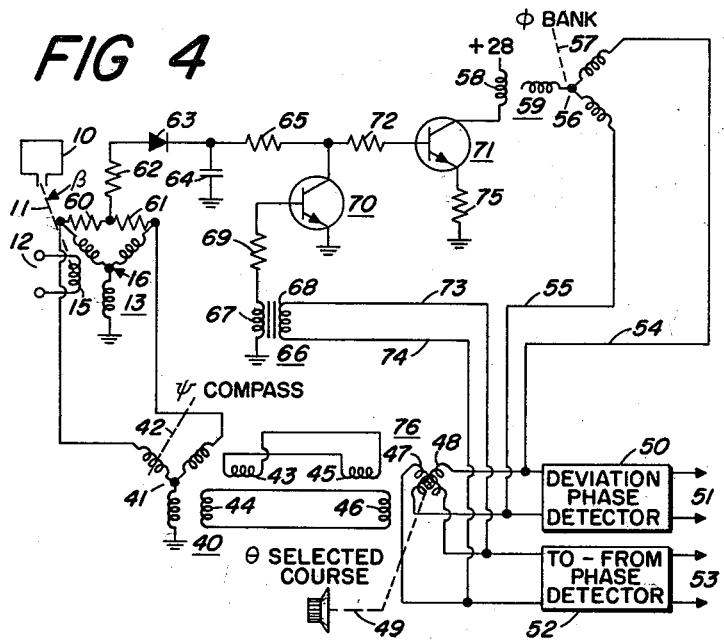
FIGURE 4 is a further embodiment showing a further adaptation to the correction circuitry of FIGURE 3 for utilization in a system employinug magnetic reference and arbitrary course selection.

The above discussed embodiments relate to the correction of an ADF bearing repeater shaft which may serve to position an ADF indicator needle to a corrected bearing indication. The present invention may further be embodied in systems employing ADF bearing data as an input parameter for automatic pilot applications, wherein the system provides an output deviation signal proportional to the discrepancy between a selected course to be flown to or from an ADF station and the instantaneous ADF bearing to the station as determined by ADF receiving equipment. Such a system is illustrated in the embodiment of FIGURE 4. In a system providing an output in accordance with deviation between a selected course angle and a measured ADF bearing angle, means are conventionally provided to convert the relative bearing angle as determined by ADF equipment to a true or magnetic bearing. The latter expedient necessitates the inclusion of compass bearing information and might be said to basically solve the equation $\alpha = \psi - \beta$, where $\alpha$ is the magnetic bearing to the ADF station, $\psi$ is the magnetic heading of the aircraft as determined by compass, and $\beta$ is the relative ADF bearing between aircraft and station. The embodiment of FIGURE 4 includes such a system wherein the output deviation signal as determined by the discrepancy between the aircraft's true bearing and a selected course may be corrected for bank induced ADF bearing errors in accordance with the present invention. The correction again is a function of bank angle $\phi$ and the cosine function of the ADF bearing $\beta$.

With reference to FIGURE 4, the ADF antenna 10 is rotated to a null position by ADF equipment (not illustrated) such that shaft 11 is positioned to ADF bearing $\beta$. The rotational position of shaft 11 is converted to electrical information indicative of the ADF bearing $\beta$ through the action of synchro transmitter 13 as in the above-described embodiments. Resistive network 60, 61 and 62 is connected to the stator 16 of synchro transmitter 13 to develop a "two wire" bearing indicative signal for application to the correction signal development circuitry similar to that described in FIGURE 3. The relative ADF bearing signal developed in the stator windings of synchro 13 is connected to like windings of a synchro transolver 40 by means of which the relative bearing $\beta$ is converted to true bearing information by rotation of the rotor 41 in accordance with a rotational input 42 corresponding to magnetic compass bearing $\phi$. This rotational input might readily be obtained by a compass repeater servo system (not illustrated). Transolver 40 is provided with first and second stator windings 43 and 44 such that the signal induced in stator winding 43 is proportional to sine $(\psi + \beta)$ while the signal induced in the other stator winding 44 is proportional to cos $(\psi + \beta)$. These two signals are connected to corresponding stator windings 45 and 46 of a course resolver 76. Rotor windings 47 and 48 of course resolver 76 are positioned by rotation of a course selection control to an arbitrarily selected course $\theta$, and have induced therein voltages respectively indicative of to-from phasing information and aircraft deviation from selected course $\theta$. Those signals are conventionally applied through corresponding phase detectors 50 and 52 to provide direct current outputs 51 and 53 for application to appropriate steering indicators or for use as input parameters to autopilot circuitry.

The operation of the compass transolver 40 and course resolver 76 are conventional in nature and need not be described in detail herein. It would suffice to state that the to-from output information is that of a signal whose phase is uniquely indicative of flight with respect to the ADF ground station either to or from the station along the selected course $\theta$. Reciprocal courses inherently introduce 180° phase relationships as concerns the outputs from course resolver 76. In essence, an output from rotor winding 47 of resolver 76 would be of one phase or the other depending upon whether the aircraft was flying the selected course $\theta$ to the station or away from the station. This phase relationship is brought about by the inclusion of true bearing information by the compass transolver 40.

For purposes of the bearing error correction principle of the present invention, the alternating current signal from rotor winding 47 of course resolver 76 is utilized as the "reference" voltage which determines the phase of the chopping action introduced by transistor 70. This signal is connected through leads 73 and 74 to the primary windings of transformer 66 for this purpose such that the phasing of the correction voltage output 54, 55 from the bank synchro transmitter 59 is dependent upon the direction of bank and also on the phasing of the two-from signal and proper bank compensation under all ADF bearing and aircraft heading situations is obtained. The output signal 54—55 from the bank synchro transmitter 59 is summed in parallel with the alternating current deviation signal developed in rotor 43 of course resolver 76. Thus, the deviation signal, as it is applied to the input of the deviation phase detector 50, is compensated for bank induced ADF error.

The present invention is thus seen to provide ready means for introducing compensation to correct for bank induced ADF bearing errors and provide means whereby such compensation may be adapted to the correction of a bearing indicating shaft or the correction of a deviation signal in systems employing arbitrary course selection.

Although the present invention has been described with respect to particular embodiments thereof, it is not to be so limited, as changes might be made therein which fall within the scope of the invention as defined in the appended claims.

I claim:

1. In an airborne radio direction finding system of the type determining the bearing $\beta$ to a radio source and comprising a rotatable loop antenna and a bearing repeating system including a synchro transmitter and synchro receiver, a servo positioning system connected to the output of said receiver for positioning a shaft in accordance with said antenna loop orientation and including means for positioning said synchro receiver in accordance with said shaft position whereby said shaft position follows that of said antenna orientation; means for correcting said shaft indication for errors induced by aircraft bank attitude, said correction means comprising a first means responsive to said shaft position and generating a first signal proportional to a function of the bearing $\beta$, means connected to and modifying said signal in accordance with aircraft bank angle $\phi$, and means for serially inserting said modified signal with the output of said synchro receiver as applied to said servo positioning system.

2. In an airborne radio direction finding system of the type determining the bearing $\beta$ to a radio source and comprising a rotatable loop antenna and a bearing repeating system including a synchro transmitter and synchro receiver, a servo positioning system connected to the output of said receiver for positioning a shaft in accordance with said antenna loop orientation and including means for positioning said synchro receiver in accordance with said shaft position whereby said shaft position follows that of said antenna orientation; means for correcting said shaft indication for errors induced by aircraft bank attitude, said correction means comprising a first means responsive to said shaft position and generating a first signal proportional to cos $2\beta$ and a further signal proportional to bank angle $\phi$, means for combining said first and second signals, and means for serially inserting said combined signal with the output of said synchro receiver as applied to said servo positioning system.

3. In an airborne radio direction finding system of the type determining the bearing $\beta$ to a radio source and comprising a rotatable loop antenna and a bearing repeating system including a synchro transmitter and synchro receiver, a servo positioning system connected to the output of said receiver for positioning a shaft in accordance with said antenna loop orientation and including means for positioning said synchro receiver in accordance with said shaft position whereby said shaft position follows that of said antenna orientation; means for correcting said shaft indication for errors introduced by aircraft bank attitude, said correction means comprising first signal generating means responsive to a bank indicative input signal and the rotational output of said shaft to generate a signal proportional to $\phi$ cos $2\beta$, a second signal generating means responsive to said bank indicative input signal and generating an output signal proportional to said bank angle $\phi$, means combining said first and second signals, and means serially inserting said combined signal with the output signal from said synchro receiver whereby said shaft is positioned in accordance with said antenna orientation modified by the function $K_1\phi + K_2\phi$ cos $2\beta$ where $K_1$ and $K_2$ are the transfer functions of said first and second correction signal generating means respectively.

4. In a radio direction finding system of the type determining the bearing $\beta$ to a radio source and comprising a rotatable loop antenna and a bearing repeating system including a synchro transmitter and synchro receiver, a servo positioning system connected to the output of said receiver for positioning a shaft in accordance with said antenna loop orientation and including means for positioning said synchro receiver in accordance with said shaft position whereby said shaft position follows that of said antenna orientation; means for correcting said shaft indication for errors introduced by aircraft bank attitude, said correction means comprising signal generating means responsive to an input signal defining said bearing $\beta$ to generate a signal proportional to the absolute value of the function cos $\beta$, means receiving said signal and modifying said signal in accordance with aircraft bank angle $\phi$, and means combining said modified signal with the output signal from said synchro receiver for application to said servo positioning system.

5. A direction finding system as defined in claim 3 wherein said first correction signal generating means comprises an electromechanical resolver having a stator member connected to said bank indicative signal and a rotor member connected to said shaft through a two to one gear ratio, said second correction signal generating means comprising a transformer with primary windings thereof receiving said bank indicative signal, and means connecting the rotor element of said resolver serially with the secondary winding of said transformer and with the output element of said synchro receiver.

6. A direction finding system as defined in claim 4 wherein said correction signal generating means comprises signal conversion means connected to said synchro transmitter and synchro receiver and converting the bearing indicative signal developed thereby to a two-wire bearing indicative output signal source including an output terminal and a common reference terminal, means connecting said output signal to detecting and filtering means, said detecting and filtering means being referred to said common reference and developing a unidirectional output signal in response to the bearing indicative input signal being applied thereto, said unidirectional output signal being maximum for bearing indicative signals corresponding to 0° and 180° and being substantially zero in response to bearing indicative input signals corresponding to bearings of 90° and 270°, means applying the output from said detecting and filtering means to an alternating current chopper, the chopping rate of which corresponds to the excitation frequency of said synchro transmitter, and means applying the output from said chopper to the input of a synchro transformer including a rotor and a stator element, means for inducing relative rotation between the elements of said synchro transformer in accordance with the bank angle of said aircraft, and means combining the output from said syncro transformer with the output from said synchro receiver as applied to said servo positioning system.

7. A direction finding system as defined in claim 6 wherein said signal conversion means comprises first and second resistive members serially connected between two terminals of said synchro transmitter with the third terminal thereof being referenced to ground, a third resistive member being connected to the junction of said first and second resistive members, said third resistive member connected to said detecting and filtering means; said detector and filtering means comprising a unilateral conductive device and a capacitor respectively serially connected between said third resistive member and common ground, said alternating current chopper comprising a transistor with collector element connected to the junction between said unilateral conduction device and said capacitor, the emitter of said transistor being connected to said common ground, means applying a control signal between the base and emitter of said transistor with frequency determined by that of said synchro transmitter excitation frequency, and means connecting the collector of said transistor through the input element of said synchro transformer to a D.C. voltage source.

8. A flight director system comprising radio direction finding means developing an output signal indicative of the relative bearing $\beta$ between a radio station and an aircraft, a synchro transolver receiving said bearing indicative signal and producing first and second output signals indicative of the rectangular co-ordinates of said direction finding bearing signal, said synchro transolver having a stator member and a rotor member, means rotating said transolver rotor member in accordance with the magnetic heading $\psi$ of the aircraft, a course resolver having first and second stator windings and first and second rotor windings with the latter respectively receiving the outputs of said synchro transolver, positioning means imparting relative rotation between the stator and rotor of said course resolver in accordance with a selected course to be flown, said first course resolver rotor winding having induced therein a course deviation signal indicative of the extent and direction of deviation between said selected course and the true bearing $(\beta+\psi)$, the other of said course resolver rotor windings having a signal induced therein having first and second phases respectively determined by aircraft heading to and from said station with respect to said selected course; means correcting said course deviation signal for error induced by bank attitude of said aircraft, said correction means comprising signal generating means responsive to an input signal defining said bearing $\beta$ to generate a signal proportional to the absolute value of the function cosine $\beta$, means receiving said signal and modifying said signal in accordance with aircraft bank angle $\phi$, and means combining said modified signal with said course deviation signal.

9. A flight director system comprising radio direction finding means developing an output signal indicative of the relative bearing $\beta$ between a radio station and an aircraft, a synchro transolver receiving said bearing indicative signal and producing first and second output signals indicative of the rectangular co-ordinates of said direction finding bearing signal, said synchro transolver having a stator member and a rotor member, means rotating said rotor member in accordance with the magnetic heading $\psi$ of the aircraft, a course resolver having first and second stator windings and first and second rotor windings with the latter respectively receiving the outputs of said synchro transolver, positioning means imparting relative rotation between the stator and rotor elements of said course resolver in accordance with a selected course to be flown, said first course resolver rotor winding having induced therein a course deviation signal indicative of the extent and direction of deviation between said selected course and the true bearing $(\beta+\psi)$, said second course resolver rotor windings having a signal induced therein having first and second phases respectively determined by aircraft heading to and from said station with respect to said selected course; means correcting said course deviation signal for error induced by bank attitude of said aircraft, said correction means comprising signal conversion means receiving the bearing indicative signal from said radio direction frequency means and converting said signal to a two wire bearing indicative signal source including an output terminal and a common reference terminal, means connecting said converted signal to detecting and filtering means, said detecting and filtering means being referred to said common reference and developing a unidirectional output signal in response to the bearing indicative input signal applied thereto, said unidirectional output signal being maximum for bearing siganls corresponding to 0° and 180° and being substantially zero in response to bearing indicative input signals corresponding to bearings of 90° and 270°, means applying the output from said detecting and filtering means to an alternating current chopper, the output of said second transolver rotor applied to said chopper to establish the chopping rate and phase thereof, and means applying the output from said chopper to the input of a synchro transformer, means for rotating the output element of said synchro transmitter in accordance with the bank angle of said aircraft, and means combining the output from said synchro transformer with the output from said first transolver rotor winding whereby said deviation signal is compensated in accordance with functions of bank angle $\phi$ and the absolute value of the cosine function of the bearing $\beta$.

10. A direction finding system as defined in claim 9 wherein the output signal from said radio direction finding means is that induced in a synchro transmitter and wherein said signal conversion means comprises first and second resistive members serially connected between two terminals of said synchro transmitter with the third terminal thereof being referenced to ground, a third resistive member being connected to the junction of said first and second resistive members, said third resistive member connected to said detecting and filtering means; said detector and filtering means comprising a unilateral conductive device and a capacitor respectively serially connected between said third resistive member and common ground, said alternating current chopper comprising a transistor with collector element connected to the junction between said unilateral conduction device and said capacitor, the emitter of said transistor being connected to said common ground, means applying the output signal from said second transolver rotor between the base and emitter of said transistor, and means connecting the collector of said transistor through the input element of said synchro transformer to a D.C. voltage source.

11. In an airborne radio direction finding system of the type determining the bearing $\beta$ to a radio source and comprising a rotatable loop antenna and a bearing repeating system including a synchro transmitter and synchro receiver, a servo positioning system connected to the output of said synchro receiver for positioning a shaft in accordance with said antenna loop orientation, and including means for positioning said synchro receiver in accordance with said shaft position whereby said shaft position follows that of said antenna orientation; means for correcting said shaft indication for error induced by aircraft bank attitude, said correction means comprising means for generating a signal proportional to aircraft bank angle and means for combining said proportional signal with the output of said synchro receiver as applied to said servo positioning system.

12. A direction finding system as defined in claim 11 wherein said correction signal generating means comprises a transformer with primary windings connected to a signal indicative of aircraft bank attitude and means connecting the secondary winding of said transformer serially with the output of said synchro receiver.

References Cited in the file of this patent

UNITED STATES PATENTS 2,460,798  McCarthy _____ Feb. 8, 1949